Patented Mar. 2, 1937

2,072,151

UNITED STATES PATENT OFFICE 2,072,151

METHOD OF OXIDIZING OIL

Robert D. Bonney, Glen Ridge, and Walter S. Egge, East Orange, N. J., assignors to Congoleum-Nairn, Inc., a corporation of New York No Drawing. Application November 19, 1931, Serial No. 576,204

22 Claims. (Cl. 87—12)

The present invention relates to the treatment of drying or semi-drying oils and more particularly to a method of preparing a drying or semi-drying oil for use in protective coating compositions.

In our co-pending applications, Serial No. 576,205, filed November 19, 1931, which matured on July 31st, 1934, as Patent No. 1,968,243, and Serial No. 576,206, filed November 19, 1931, which matured July 31st, 1934, as Patent No. 1,968,244, we describe and claim certain novel types of protective coating compositions and methods of making the same, which compositions comprise, as the major ingredient, that component of oxidized drying or semi-drying oil which is in fluid phase and is substantially free from coagulated products of oxidation and has been separated from a substantial proportion of unoxidized and unoxidizable oil constituents and may have been separated from other products of oxidation having certain undesirable characteristics. Usually a resin is also combined with such component of oxidized oil by mixing it with said component after such separation or by mixing it with the raw oil and oxidizing the mixture and then making the separation. When the selected resin is neutral or weakly acid in character, or when no resin is employed, it has been found that the yield of the desired constituents of oxidized oil or oil-resin in fluid phase is somewhat reduced. This condition is due to the fact that the oil constituents first oxidized commence to coagulate to the solid or linoxyn phase while a substantial portion of the oxidizable constituents of the oil are still unoxidized.

The object of the present invention is to provide an improved method of oxidizing drying or semi-drying oils, either with or without the addition of a resin, whereby the yield of the oxidized constituents of the oil or oil-resin in fluid phase may be increased. Broadly our invention contemplates oxidizing a drying or semi-drying oil, either with or without the addition of a resin, in the presence of .1 to 2% of maleic acid (or maleic acid anhydride) or an equivalent acidic substance difficultly volatile at processing temperatures.

Our improved method of treating drying or semi-drying oils and, if desired, of combining a resin therewith, is typified by the following specific example. Three parts of linseed oil and one part of ester gum resin are heated to about 115° C. until the resin is dissolved. The temperature is then lowered to about 80° C. and .5% of maleic acid is added. The maleic acid or maleic acid anhydride may be added in the dry state but is more conveniently added in the form of solution in a solvent of which acetone is one example. A suitable drier, for example, .04% of cobalt linoleate, may also be added. The batch is then aerated at a temperature approximating 80° C. for 25 to 30 hours until it becomes very viscous. When a tested sample just fails to completely dissolve in ethyl ether, the oxidation is discontinued.

To complete the preparation of that component of the oxidized oil, or oil-resin, for use in compounding protective coating compositions which are the subjects of our inventions described and claimed in the above-identified co-pending applications, the batch is cooled and treated to effect separation along the lines above mentioned as by treatment with an excess of a solvent capable of dissolving the unoxidized and unoxidizable oil constituents which are not desired in large proportions in coating compositions of the type referred to, but possessing little, if any, solvating action on the desired component of the oxidized but uncoagulated oil or oil-resin. The preferred solvent is petroleum ether (boiling range 30° to 75° C.) and about three to five volumes thereof to one volume of the oxidized oil-resin batch are desirable. Petroleum naphtha (boiling range 60° to 160° C.) may be used as an equivalent extracting solvent. The desired component of the oxidized oil or oil-resin mixture in fluid phase, separates to form a lower layer, while the unoxidized and unoxidizable oil constituents dissolve in the extracting solvent forming an upper layer which may be removed by decantation. The extraction process is preferably repeated two or three times to assure an adequate separation. The remaining oxidized oil or oil-resin mixture, in fluid phase, is then subjected to low heat, preferably in a vacuum, to remove the last portions of the extracting solvent, after which it is ready for use as the desired fluid component of the oxidized oil or oil-resin mixture. For convenience in handling, and to prevent premature gelation and solidification, the extracted oil or oil-resin is dissolved in a suitable solvent such as toluene, butyl acetate, xylene, hi-flash naphtha to provide a 60 to 80% solution.

The improved method of oxidation will be carried out in the same manner when other drying or semi-drying oils, such as perilla or soya bean oil are used, or when other resins are employed. The proportion of resin to oil may of course be varied as desired, depending upon the predetermined characteristics of the ultimate composition. In order to secure a product substantially free from linoxyn it is to be noted that the oxidation of the raw oil or resin-raw-oil mix is discontinued at, or just before, the point when the oxidized oil first commences to coagulate to the gel or linoxyn phase. This point may be determined by the ethyl ether test. So long as no linoxyn is formed, the constituents of the batch undergoing oxidation will dissolve completely in ethyl ether, but upon the initial formation of linoxyn a cloudy precipitate will appear in the sample tested.

Following the teaching of our improved method the yield of oxidized constituents of the oil or oil-resin in fluid phase (i. e. that portion of the batch soluble in ethyl ether but insoluble in petroleum ether) will, in the above specific example, approximate 85%, by weight, whereas a yield of only about 60% is obtained when the maleic acid or an equivalent is not employed. The fluid oxidized constituents of the oil are composed chiefly of the oxidized glycerides of linolic and linolenic acids, while the undesirable oil constituents, amounting to 15% or more of the total oil, exclusive of added resin, separated by the extraction treatment, comprise chiefly the unoxidizable glycerides of stearic, or palmitic, or other saturated acids, any unoxidized glycerides of linolic and linolenic acids, and also the oxidized glyceride of oleic acid.

It is apparent that by procedure in accordance with this invention there is achieved that object which is to provide an improved method of oxidizing drying or semi-drying oils, either with or without the addition of a resin, whereby the yield of oxidized constituents of the oil or oil-resin mixture in fluid phase is increased. From the foregoing general description and illustrative example of procedure in accordance with this invention, and of the results thereof, important features and effects of the invention which are inherent in such procedure and results become apparent. An important result is that oxidizing treatment of a drying or semi-drying oil in accordance with this invention produces a large yield of desired oxidized constituents of the oil which are in fluid phase and substantially free of coagulated products of the oxidizing treatment and may be separated from unoxidized and unoxidizable constituents of the oil and from other products of oxidizing treatment which have certain undesirable characteristics. The desired oxidized constituents of the oil, which are the oxidized glycerides of linolic and of linolenic acids in the example, have the property of coagulating during as well as after an ordinary or uncontrolled oxidizing treatment to form coagulated products of oxidation, such as linoxyn, in which form they are insoluble in solvents commonly used in coating compositions and are not suitable for use as an ingredient of such compositions; but in accordance with this invention an increased and large proportion of the glycerides of linolic and linolenic acids in the oil are converted into the oxidized glycerides of linolic and of linolenic acids which are in fluid phase and still have the property of coagulating, they will harden or dry without substantial further oxidation and even without contact with air, and they are soluble in solvents commonly employed in coating compositions and a coating comprising a solution thereof hardens rapidly upon evaporation of the solvent to form a tough and adherent film of high distensibility. The product of the present oxidizing treatment is substantially free of coagulated oxidation products, a feature of the invention being that the oxidizing treatment is limited to prevent formation thereof. The unoxidized and unoxidizable constituents of the oil which are not oxidized in the oxidizing treatment which is so conducted as to produce the desired oxidized constituents in fluid phase, are constituents of the oil subjected to oxidizing treatment which cannot be oxidized in that treatment or by contact with air and do not possess the property of hardening, such as glycerides of saturated organic acids of which stearic and palmitic are examples; or they are constituents of the oil which are capable of being converted by the oxidizing treatment into substances having the property of hardening and which were not so converted in the oxidizing treatment but will harden under the action of air or other oxidizing treatment, such as glycerides of linolic and of linolenic acids. The other products of the oxidizing treatment which have certain undesirable characteristics, above mentioned, are oxidized constituents which do not possess the property of coagulating or hardening either upon standing or upon exposure to the air or to other oxidizing influences, such as oxidized glycerides of oleic acid.

An effect of this invention is to minimize in the oil which has been subjected to oxidation the proportion of the oxidizable but unoxidized constituents which are capable of hardening when oxidized, while forming the desired oxidized constituents in fluid phase and avoiding or minimizing formation of coagulated products of oxidation.

The product of the oxidizing treatment carried out in accordance with this invention has the property of being compatible with nitro-cellulose in a common solvent. The increased and high proportion of oxidized constituents present in fluid phase and capable of hardening, achieved by this invention, renders the product much superior, as an ingredient of coating compositions, to oxidized oils heretofore proposed.

As a further feature of this invention, drying or semi-drying oil which has been subjected to oxidizing treatment in accordance with this invention is treated to effect separation of unoxidized and unoxidizable constituents and undesirable oxidized constituents above mentioned, from the desired oxidized constituents, and as a result glycerides of saturated organic acids, oxidized constituents such as oxidized glycerides of oleic acid which do not possess the property of coagulating and hardening, and oxidizable constituents which have not been oxidized, are separated from the desired oxidized constituents. The product of oxidation treatment in accordance with this invention, after removal therefrom of constituents other than the desired products of oxidation, is very superior, as an ingredient of a coating composition, to oxidized oils from which said constituents have not been removed. While it is preferable that the amount of unoxidized and unoxidizable and undesirable oxidized constituents remaining in the desired oxidized constituents should be at a minimum, nevertheless, the difficulty of securing a quantitative elimination of these constituents in commercial operation makes it inexpedient to render the desired oxidized constituents entirely free therefrom; but the desired oxidized constituents are improved as an ingredient of a coating composition by removal therefrom of any substantial proportion of the unoxidized and unoxidizable constituents and undesirable oxidized constituents, very good results being obtainable when that removal is carried to such extent that the residual or final product used as such ingredient comprises about 90% or more of desired oxidized constituents of oil, and the advantages becoming more pronounced as that percentage is increased. Moreover, oxidizable but unoxidized constituents remaining with the desired oxidized constituents will harden under the action of air but will do so more slowly than will the desired oxidized constituents which harden without substantial further oxidation. While the separation of desired oxidized constituents of the oil from unoxidizable and unoxidized and oxidized but non-hardening constituents is incomplete in commercial operation, the separation effects a division of the product of the oxidizing treatment into a fraction which is richer in constituents which are unoxidized or unoxidizable or non-hardening though oxidized than is the whole product of the oxidation, and a fraction which is richer in desirable oxidized constituents than is the whole product of oxidation and which possesses the characteristics rendering it a superior ingredient of a coating composition. The putting of the separated desirable oxidation products into solution in the solvents named effects a precipitation and removal of any coagulated oxidized constituents that may have been formed in the oxidizing treatment or subsequent treatment.

The inherent characteristics of the oils mentioned as examples of oils useful in connection with this invention will indicate the type of oils which are suited to treatment in accordance with this invention. They contain a high proportion of constituents, such as glycerides of linolic and of linolenic acids, which are capable of being converted in the oxidizing treatment to substances which are in fluid phase and capable of coagulating and hardening without substantial further oxidation; they contain a relatively low proportion of substances, such as glycerides of saturated organic acids, which are not oxidizable into desired oxidized constituents in the oxidizing treatment; they contain a relatively low proportion of constituents which are converted by the oxidizing treatment into substances which do not coagulate or harden either upon standing or exposure to the air or to other oxidizing influences, such as glyceride of oleic acid; and they contain little, if any, of constituents which are unavoidably converted by the oxidizing treatment into substances which exist only in coagulated form, such as glyceryl elaeostearate which is present in large proportion in tung oil and of which the oxidation product is coagulated. As above indicated, other oils possess these characteristics and are well-suited for treatment in accordance with this invention, a further example of oil obtainable in commercial quantities being rubberseed oil.

While we have found that maleic acid is most effective in increasing the yield of oxidized oil in fluid phase, other acidic substances which are non-volatile or difficultly volatile at the processing temperatures may be used as equivalents therefor. Among these may be mentioned: boric acid, benzoic acid, anthranilic acid, citric acid, oxalic acid, picric acid, salicylic acid, tartaric acid, malic acid, succinic acid, lactic acid, acetylsalicylic acid and sulfonilic acid. Inasmuch as certain of these substances are less acidic than maleic acid and vary in effectiveness, it will be found necessary to use varying quantities in order to secure equivalent results. Such substances, however, as above noted in connection with maleic acid, for example, are effective when they are present in small amount relatively to the oil as inhibitors of coagulation of the oil ingredients coagulatable upon oxidation of the oil. In other words, such substances have the specific effect of inhibiting coagulation of the oil under the conditions of the oxidation thereof as distinguished from substances which are merely diluents for the oil and from reagents which convert the normally coagulable constituents of the oil into compounds lacking the characteristic properties of those constituents without exercising any such specific anti-coagulant effect.

From the foregoing it will be apparent that in the treatment of drying or semi-drying oil in accordance with this invention the oil is subjected to oxidation limited to prevent formation of congealed products of oxidation such as linoxyn, in the presence of an agent which retards or prevents coagulation of products of oxidation under the oxidizing conditions existing, as by subjecting the oil to such oxidation in the presence of maleic acid, or, more broadly stated, by subjecting the oil to such oxidation at elevated temperature in the presence of an equivalent acidic substance which does not readily volatilize at the temperature employed, thus effecting more extensive formation of fluid products of oxidation before substantial formation of coagulated products of oxidation; and there is obtained a substantial increase in the yield of the desired fluid oxidized constituents of the oil which are substantially free of coagulated products of oxidation and are capable of separation from a substantial and even major proportion of undesirable unoxidized and unoxidizable constituents and undesirable or non-hardening constituents of the oil which has been subjected to oxidation. It is our belief that the efficacy of the agent used in the practice of our invention for retarding coagulation under oxidizing conditions is due to dissociation that provides hydrogen ions in the oil; and that water formed when the oil oxidizes facilitates such dissociation if the agent is introduced in the form of an anhydride. Coagulation of drying oil results when it is subjected to extensive uncontrolled oxidation at somewhat elevated temperature, as in the production of linoxyn in linoleum manufacture; gelation of drying oil occurs, in the absence of oxidation, as a result of mere heat reaction when the oil is subjected, with or without a catalyst, to very high temperature and combustion is prevented by avoiding oxidizing conditions, as in the heating of oil to 500° to 600° F. in an inert atmosphere in ordinary varnish manufacture; and there is little or no tendency for oxidized oil particles to agglomerate at room temperatures. Accordingly, the advantages of this invention are realized in a treatment which is actually an oxidizing operation carried out at temperatures low enough to avoid combustion due to the presence of substantial quantities of oxygen, but substantially above ordinary room temperature, elevated temperatures heretofore employed in oxidation of drying or semi-drying oils being suitable, e. g., 60°–110° C. for aeration of linseed oil.

We claim:

1. The process of treating a drying or semi-drying oil in which the production of oxidized products in liquid phase is promoted, which comprises the steps of oxidizing said oil at an elevated temperature not substantially below about 60° C. with oxygen-containing gas in the presence of a small amount of maleic acid as an agent to inhibit coagulation of the oil during the oxidation, and continuing the oxidation of the oil until the degree of oxidation thereof exceeds that at which coagulation would occur in the absence of said acid.

2. The process of oxidizing a drying or semi-drying oil in which the production of oxidized products in liquid phase is promoted, which comprises admixing the oil with a resin and oxidizing the mixture at an elevated temperature not below about 60° C. with oxygen-containing gas in the presence of a small amount of maleic acid, as an agent to inhibit coagulation of the oil-resin during the oxidation, and continuing the oxidation of the oil until the degree of oxidation thereof exceeds that at which coagulation would occur in the absence of said acid.

3. The process of preparing an oxidized oil in liquid phase, which comprises the steps of oxidizing a drying or semi-drying oil at an elevated temperature not below about 60° C. with oxygen-containing gas in the presence of a small amount of maleic acid, as an agent to inhibit coagulation of the oil during the oxidation, continuing the oxidation of the oil until the degree of oxidation thereof exceeds that at which coagulation would occur in the absence of said acid, discontinuing the oxidation prior to the coagulation of the oxidized oil to form linoxyn, and separating and removing a substantial proportion of the unoxidized and unoxidizable oil constituents of the oxidized oil.

4. The process of preparing an oxidized oil in liquid phase, which comprises the steps of admixing a drying or semi-drying oil and a resin, oxidizing said mixture at an elevated temperature not below about 60° C. with oxygen-containing gas in the presence of a small amount of maleic acid as an agent to inhibit coagulation of the oil-resin during the oxidation continuing the oxidation of the oil until the degree of oxidation thereof exceeds that at which coagulation would occur in the absence of said acid, discontinuing the oxidation prior to the coagulation of the oxidized oil-resin to form linoxyn, and separating and removing a substantial proportion of the unoxidized and unoxidizable oil constituents of the oxidized oil.

5. The process of preparing an oxidized oil in liquid phase, which comprises the steps of oxidizing a drying or semi-drying oil at an elevated temperature not below about 60° C. with oxygen-containing gas in the presence of maleic acid as an agent to inhibit coagulation of the oil during the oxidation, continuing the oxidation of the oil until at least about 60% of said oil becomes an oxidized oil constituent in liquid phase which is soluble in ethyl ether but is insoluble in petroleum ether, discontinuing the oxidation prior to the coagulation of the oxidized oil to form linoxyn, and extracting the unoxidized and unoxidizable oil constituents with petroleum ether.

6. In a process for treating linseed oil to produce a high yield of oxidation products thereof in liquid phase, the step which comprises aerating the oil at elevated temperature not substantially below about 60° C. in the presence of approximately 0.1 to approximately 2% of maleic acid as an agent to inhibit coagulation of the oil during the oxidation, and continuing the oxidation of the oil until the yield of said products exceeds that attainable in the absence of said acid.

7. In a process for treating a drying or semi-drying oil in which the production of oxidized products in liquid phase is promoted, the steps which comprise subjecting the oil to oxidizing treatment with oxygen-containing gas at an elevated temperature not substantially below about 60° C. in the presence of a small amount of an acid of the group consisting of maleic, boric, benzoic, anthranilic, citric, oxalic, picric, salicylic, tartaric, malic, succinic, lactic, acetylsalicylic, and sulfonilic as an agent to inhibit coagulation of the oil during the oxidation, and continuing the oxidation of the oil until the degree of oxidation thereof exceeds that at which coagulation would occur in the absence of said acid.

8. In a process for treating a drying or semi-drying oil in which the production of oxidized products in liquid phase is promoted, the steps which comprise subjecting the oil to aeration at a temperature in the neighborhood of 80° C. in the presence of a small amount of an acid of the group consisting of maleic, boric, benzoic, anthranilic, citric, oxalic, picric, salicylic, tartaric, malic, succinic, lactic, acetylsalicylic, and sulfonilic, as an agent to inhibit coagulation of the oil during the oxidation, and continuing the oxidation of the oil until the degree of oxidation thereof exceeds that at which coagulation would occur in the absence of said acid.

9. In a process for treating a drying or semi-drying oil in which the production of oxidized products in liquid phase is promoted, the steps which comprise subjecting the oil to oxidizing treatment with oxygen-containing gas at an elevated temperature not substantially below about 60° C. in the presence of a small amount of an acid of the group consisting of maleic, boric, benzoic, anthranilic, citric, oxalic, picric, salicylic, tartaric, malic, succinic, lactic, acetylsalicylic, and sulfonilic, as an agent to inhibit coagulation of the oil during the oxidation, continuing the oxidation of the oil until the degree of oxidation thereof exceeds that at which coagulation would occur in the absence of said acid, discontinuing the oxidizing treatment prior to substantial formation of coagulated oxidation products, and separating from the oil unoxidized and unoxidizable constituents thereof.

10. The process of preparing an oxidized oil in liquid phase, which comprises aerating linseed oil at an elevated temperature not substantially below about 60° C. in the presence of a small amount of maleic acid and thereby subjecting the oil to oxidizing treatment in the presence of said acid as an agent to inhibit coagulation of the oil during the oxidation, continuing the oxidation of the oil until the degree of oxidation thereof exceeds that at which coagulation would occur in the absence of said acid, discontinuing the oxidizing treatment prior to substantial formation of coagulated products of oxidation, and extracting with low-boiling liquid hydrocarbon the product of the oxidizing step.

11. In a process for the treatment of drying or semi-drying oil in which the production of oxidized products in liquid phase is promoted, the steps comprising subjecting to oxidizing treatment with oxygen containing gas at an elevated temperature not substantially below about 60° C. a drying or semi-drying oil having therein an agent to retard coagulation of the oil during the oxidation that is in the form of an acid and is substantially non-volatile at said elevated temperature and is effective in small amount for retarding coagulation of oxidized constituents of the oil under the oxidizing conditions, continuing the oxidation of the oil until at least about 60% of said oil becomes an oxidized oil constituent in liquid phase which is soluble in ethyl ether but is insoluble in petroleum ether, separating and removing from the oxidized oil unoxidized oil constituents and non-hardening oil constituents of the oxidized oil and thereby producing a fraction of oxidized oil comprising a large proportion of liquid constituents capable of hardening without substantial further oxidation.

12. In a process for the treatment of drying or semi-drying oil to produce oxidized oil in liquid phase, the steps comprising subjecting to oxidizing treatment with oxygen containing gas at an elevated temperature not substantially below about 60° C. a drying or semi-drying oil having therein an agent to retard coagulation of the oil during the oxidation that is in the form of an acid and is substantially non-volatile at said elevated temperature and is effective in small amount for retarding coagulation of oxidized constituents of the oil under the oxidizing conditions, continuing the oxidation of the oil until at least about 60% of said oil becomes an oxidized oil constituent insoluble in petroleum ether; limiting the oxidation treatment substantially to the formation of liquid products of oxidation, and separating the liquid oxidized oil into a fraction richer than the oxidized oil in unoxidized constituents and oxidized but non-hardening constituents in the oxidized oil and a fraction richer than the oxidized oil in liquid oxidized glycerides of linolic and linolenic acids.

13. In a process for the treatment of drying or semi-drying oil to produce oxidized oil in liquid phase, the steps comprising subjecting to oxidizing treatment with oxygen containing gas at an elevated temperature not substantially below about 60° C. a drying or semi-drying oil having therein an agent to retard coagulation of the oil during the oxidation that is in the form of an acid and is substantially non-volatile at said elevated temperature and is effective in small amount for retarding coagulation of oxidized constituents of the oil under the oxidizing conditions, continuing the oxidation of the oil until at least about 60% of said oil becomes an oxidized oil constituent insoluble in petroleum ether, limiting the oxidation treatment substantially to the formation of liquid products of oxidation, and extracting the resulting oxidized oil with petroleum ether.

14. In a process for the treatment of drying or semi-drying oil in which the production of oxidized products in liquid phase is promoted, the steps comprising subjecting to oxidizing treatment with oxygen containing gas at an elevated temperature not substantially below about 60° C. a drying or semi-drying oil having therein a small amount of an agent that is in the form of an acid and is substantially non-volatile at said elevated temperature for retarding coagulation of oxidized constituents of the oil under the oxidizing conditions, continuing the oxidation of the oil until the degree of oxidation thereof exceeds that at which coagulation would otherwise occur, separating and removing from the oxidized oil unoxidized oil constituents and non-hardening oil constituents of the oxidized oil and thereby producing a fraction of oxidized oil comprising a large proportion of liquid constituents capable of hardening without substantial further oxidation.

15. In a process for the treatment of drying or semi-drying oil to produce oxidized oil in liquid phase, the steps comprising subjecting to oxidizing treatment with oxygen containing gas at an elevated temperature not substantially below about 60° C. a drying or semi-drying oil having therein a small amount of an agent that is in the form of an acid and is substantially non-volatile at said elevated temperature for retarding coagulation of oxidized constituents of the oil under the oxidizing conditions, continuing the oxidation of the oil until the degree of oxidation thereof exceeds that at which coagulation would otherwise occur, limiting the oxidation treatment substantially to the formation of liquid products of oxidation, separating and removing from the liquid oxidized oil unoxidized oil constituents and non-hardening oil constituents of the oxidized oil and thereby producing from the oil treated a large fraction of liquid oxidized oil capable of hardening without substantial further oxidation.

16. In a process for the treatment of drying or semi-drying oil to produce oxidized oil in liquid phase, the steps comprising subjecting to oxidizing treatment with oxygen containing gas at an elevated temperature not substantially below about 60° C. a drying or semi-drying oil, having therein a small amount of an agent that is in the form of an acid and is substantially non-volatile at said elevated temperature for retarding coagulation of oxidized constituents of the oil under the oxidizing conditions, continuing the oxidation of the oil until the degree of oxidation thereof exceeds that at which coagulation would otherwise occur, limiting the oxidation treatment substantially to the formation of liquid products of oxidation, and extracting with a low boiling hydrocarbon the liquid product of the oxidizing treatment and thereby separating therefrom unoxidized oil constituents and non-hardening oil constituents of the oxidized oil.

17. In a process for the treatment of drying or semi-drying oil to produce oxidized oil in liquid phase, the steps comprising subjecting to oxidizing treatment with oxygen containing gas at an elevated temperature not substantially below about 60° C. a drying or semi-drying oil having therein a small amount of an agent that is in the form of an acid and is substantially non-volatile at said elevated temperature for retarding coagulation of oxidized constituents of the oil under the oxidizing conditions, continuing the oxidation of the oil until the degree of oxidation thereof exceeds that at which coagulation would otherwise occur, limiting the oxidation treatment substantially to the formation of liquid products of oxidation, and separating the liquid oxidized oil into a fraction richer than the oxidized oil in unoxidized constituents and oxidized but non-hardening constituents in the oxidized oil and a fraction richer than the oxidized oil in liquid oxidized constituents of the oil which are capable of hardening without substantial further oxidation.

18. The process of treating a drying or semi-drying oil in which the production of oxidized products in liquid phase is promoted, which comprises oxidizing the said oil at an elevated temperature not below about 60° C. with oxygen-containing gas in the presence of an amount of maleic acid effective to inhibit coagulation of the oil during the oxidation, said oxidation being conducted without substantial coagulation of said oil and until at least about 60% of said oil becomes an oxidized oil constituent insoluble in petroleum ether.

19. The process of treating linseed oil in which the production of oxidized products in liquid phase is promoted which comprises aerating the oil at an elevated temperature not substantially below about 60° C. in the presence of an amount of maleic acid effective to inhibit coagulation of the oil during the oxidation, said oxidation being conducted without substantial coagulation of said oil and until at least about 60% of said oil becomes an oxidized oil constituent insoluble in petroleum ether.

20. In a process of treating a drying or semi-drying oil in which the production of oxidized products in liquid phase is promoted, the steps comprising subjecting the oil to oxidizing treatment with oxygen-containing gas at an elevated temperature not substantially below about 60° C. in the presence of an amount of an acid of the group consisting of maleic, boric, benzoic, anthranilic, citric, oxalic, picric, salicylic, tartaric, malic, succinic, lactic, acetylsalicylic, and sulfonilic effective to inhibit coagulation of the oil during the oxidation, said oxidation being conducted until at least about 60% of said oil becomes an oxidized oil constituent in liquid phase which is soluble in ethel ether but is insoluble in petroleum ether.

21. In a process for treating a drying or semi-drying oil in which the production of oxidized products in liquid phase is promoted, the steps comprising subjecting the oil to oxidizing treatment with an oxygen containing gas at an elevated temperature not below about 60° C. in the presence of an amount of an acid of the group consisting of maleic, boric, benzoic, anthranilic, citric, oxalic, picric, salicylic, tartaric, malic, succinic, lactic, acetylsalicylic, and sulfonilic effective to inhibit coagulation of the oil during the oxidation, said oxidation being conducted without formation of substantial quantities of coagulated products of oxidation and until at least about 60% of said oil becomes an oxidized oil constituent insoluble in petroleum ether, and separating from the oil unoxidized and unoxidizable constituents soluble in petroleum ether.

22. The process of treating a drying or semi-drying oil in which the production of oxidized products in liquid phase is promoted which comprises admixing the oil with a resin and oxidizing the mixture at an elevated temperature not below about 60° C. with oxygen-containing gas in the presence of an amount of an acid of the group consisting of maleic, boric, benzoic, anthranilic, citric, oxalic, picric, salicylic, tartaric, malic, succinic, lactic, acetylsalicylic, and sulfonilic effective to inhibit coagulation of the oil during the oxidation, said oxidation being conducted without formation of substantial quantities of coagulated products of oxidation and until at least about 60% of the oil component of said mixture is an oxidized oil constituent insoluble in petroleum ether.

ROBERT D. BONNEY.
WALTER S. EGGE.